United States Patent [19]

Nakagawa et al.

[11] Patent Number: 4,972,467
[45] Date of Patent: Nov. 20, 1990

[54] ECHO CANCELLER

[75] Inventors: Fujio Nakagawa; Akira Kanemasa, both of Tokyo, Japan

[73] Assignee: NEC Corporation, Tokyo, Japan

[21] Appl. No.: 221,968

[22] Filed: Jul. 20, 1988

[30] Foreign Application Priority Data

Jul. 20, 1987 [JP] Japan .................................. 62-181896
Nov. 6, 1987 [JP] Japan .................................. 62-281330
Nov. 6, 1987 [JP] Japan .................................. 62-281332

[51] Int. Cl.[5] .............................................. H04M 1/00
[52] U.S. Cl. ..................................... 379/411; 379/410; 370/32.1; 375/120
[58] Field of Search ....................... 379/406, 410, 411; 375/120; 370/32.1, 32

[56] References Cited

U.S. PATENT DOCUMENTS 4,695,998 9/1987 Schollmeier et al. ............... 370/32.1

FOREIGN PATENT DOCUMENTS 0192359 8/1986 European Pat. Off. ............ 379/411

OTHER PUBLICATIONS

"Adaptive Echo Canceling for Baseband Data Transmissioin", *Electrical Communication*, vol. 59, No. 3, 1985, pp. 338,344.
"Clock Sensitivity Reduction in Echo Cancellers", S. A. Cox, Electronics Letters, vol. 21, No. 14, 7-4-85, pp. 585-586.

*Primary Examiner*—Jin F. Ng
*Assistant Examiner*—Jhancy Augustus
*Attorney, Agent, or Firm*—Sughrue, Mion, Zinn, Macpeak & Seas

[57] ABSTRACT

An echo canceller includes a first transversal filter for generating a first echo canceling signal to be canceled from an output signal from a sampler, the first echo canceling signal corresponding to a first sampling value of an echo response waveform of an echo path by a sampling clock when no sampling clock jitter occurs, a second transversal filter for generating a second echo canceling signal corresponding to a difference between the first sampling value and a second sampling value when the sampling clock jitter occurs, two subtractors for canceling the first and second echo canceling signals from a digital reception signal output from the sampler, and a controller for detecting the sampling clock jitter and performing a control operation such that a tap coefficient value of the second filter is added to a tap coefficient value of the first filter to update the tap coefficient value of the first filter, and thereafter, the second echo canceling signal generating operation of the second filter is disabled.

4 Claims, 4 Drawing Sheets

ECHO CANCELLER

BACKGROUND OF THE INVENTION

The present invention relates to an echo canceller and, more particularly, to an echo canceller which has a function of compensating for a sampling clock jitter.

In an echo canceller, sampling clocks for sampling an echo signal must be stable. If a so-called sampling clock jitter, e.g., nonuniform sampling clock intervals or an out-of-phase state of sampling clocks as a whole, occurs, echo canceling power of the echo canceller is extremely reduced.

However, in a conventional echo canceller, an appropriate countermeasure against a variation in sampled echo signals caused by the sampling clock jitter is not taken.

SUMMARY OF THE INVENTION

It is an object of the present invention to provide an echo canceller which can eliminate the conventional drawbacks, and has a function of compensating for a variation in sampled echo signals caused by the sampling clock jitter.

An echo canceller according to the present invention comprises an echo path consisting of a D/A converter for converting a digital transmission signal into an analog signal, a hybrid circuit for supplying an output from the D/A converter onto a transmission path, and for receiving an analog reception signal from the transmission path and outputting the reception signal onto a path different from the transmission signal, and a sampler for sampling the reception signal with a predetermined sampling clock and outputting the sampled signal as a digital reception signal; a first transversal filter for generating a first echo canceling signal to be subtracted from an output signal from the sampler, the first echo canceling signal corresponding to a first sampling value of an echo response waveform of the echo path by the sampling clock when no sampling clock jitter occurs; a second transversal filter for generating a second echo canceling signal to be subtracted from the output signal from the sampler, the second echo canceling signal corresponding to a difference between the first sampling value and a second sampling value of the echo response waveform of the echo path by the sampling clock when the sampling clock jitter occurs; means for subtracting the first and second echo canceling signals from the digital reception signal output from the sampler; and control means for detecting the sampling clock jitter and performing a control operation such that the second echo canceling signal generating operation of the second filter is enabled when the sampling clock jitter occurs, a tap coefficient value of the second filter is added to a tap coefficient value of the first filter to update the tap coefficient value of the first filter, and thereafter, the second echo canceling signal generating operation of the second filter is disabled.

DETAILED DESCRIPTION OF THE PREFERRED EMBODIMENTS

Preferred embodiments of the present invention will be described hereinafter in detail with reference to the accompanying drawings.

Figure 1:
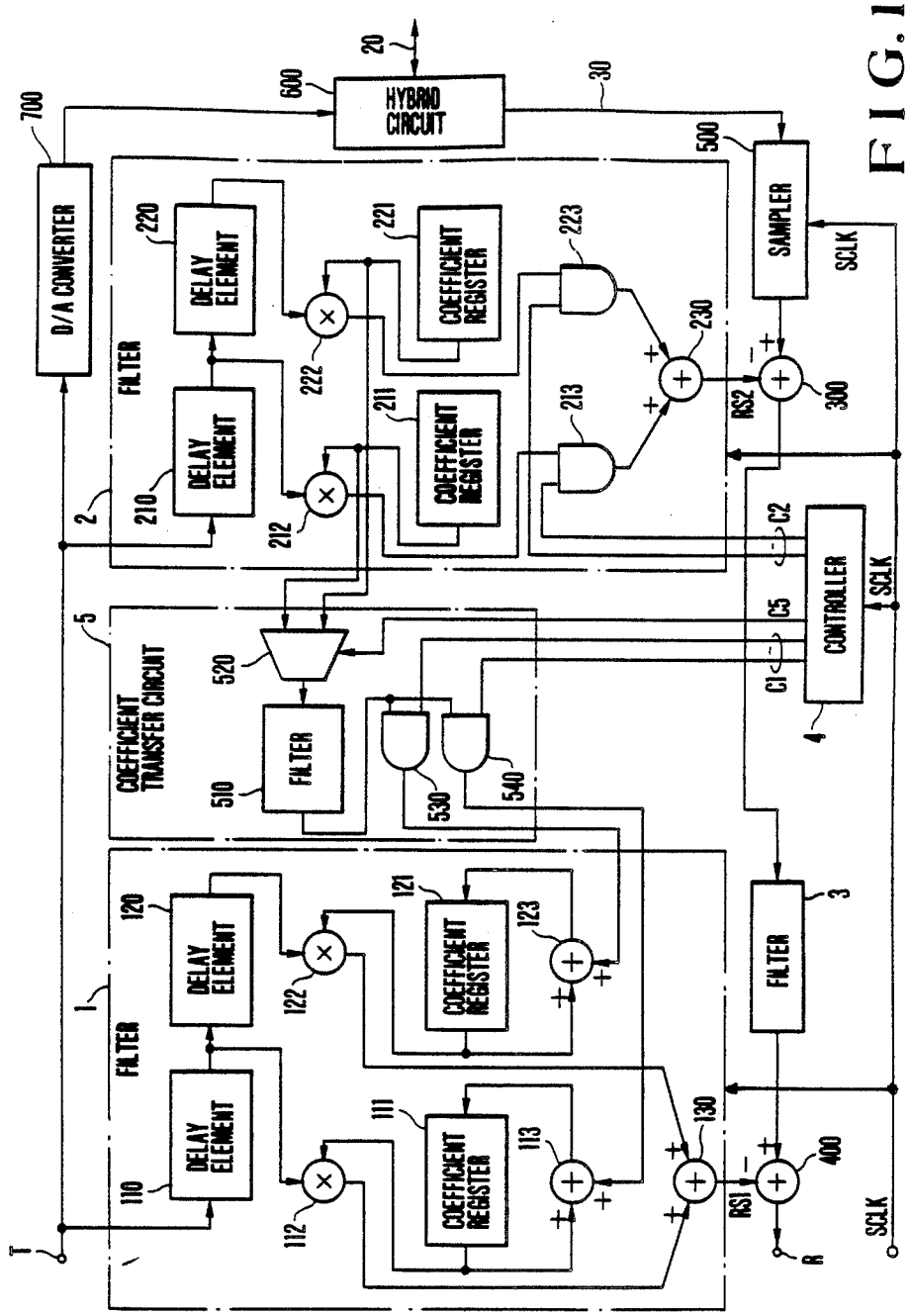
FIG. 1 is a block diagram showing an arrangement of an embodiment of the present invention.

FIG. 1 shows an arrangement according to an embodiment of the present invention.

Referring to FIG. 1, a digital transmission signal supplied from an input terminal T is input to a D/A converter 700 and filters 1 and 2. The D/A converter 700 converts the input signal into an analog pulse signal, and outputs the analog pulse signal to a hybrid circuit 600. The hybrid circuit 600 performs 2-wire/4-wire conversion, and sends the analog transmission signal onto a 2-wire transmission path 20. A reception signal received through the 2-wire transmission path 20 is supplied to a sampler 500 through a line 30 by the hybrid circuit 600. The reception signal input to the sampler 500 through the line 30 includes a transmission signal received through a so-called echo path including the D/A converter 700, the hybrid circuit 600, and the sampler 500 as an echo signal.

The sampler 500 samples the input signal thereof using a sampling clock SCLK supplied from a timing signal generator (not shown). An echo canceling signal RS2 output from the filter 2 is subtracted from the output of the sampler 500 by an adder 300. The output of the adder 300 is supplied to an adder 400 through the filter 3. An echo canceling signal RS1 supplied from the filter 1 is subtracted from the output of the adder 300 by the adder 400. The signal thus obtained is output from an output terminal R as a reception signal.

In the filter 1, the transmission signal is held in delay elements 110 and 120. The output signals from the delay elements 110 and 120 are respectively multiplied with coefficients held in coefficient registers 111 and 121 by multipliers 112 and 122. The outputs from the multipliers 112 and 122 are added to each other by an adder 130. The sum is output to the adder 400 as the echo canceling signal RS1. The filter 1 is always operated in synchronism with the sampling clock SCLK of the sampler 500.

In the filter 2, the transmission signal is held in delay elements 210 and 220. The outputs of the delay elements 210 and 220 are respectively multiplied with coefficients stored in coefficient registers 211 and 221 by multipliers 212 and 222. The outputs of the multipliers 212 and 222 are input to the corresponding input terminals of AND gates 213 and 223, respectively. The other input terminal of each of the AND gates 213 and 223 receives a control signal C2 supplied from a controller 4 (to be described later). The outputs of the AND gates 213 and 223 are added to each other by an adder 230, and the sum is output to the adder 300 as the echo canceling signal RS2.

The outputs of the coefficient registers 211 and 221 of the filter 2 are input to a selector 520 of a coefficient transfer circuit 5. The selector 520 sequentially selects the two input signals in response to a control signal C5 supplied from the controller 4, and outputs the selected signal to a filter 510 having the same transfer function as that of a filter 3. The output of the filter 510 is supplied to one input terminal of each of AND gates 530 and 540.

The other input terminal of each of AND gates 530 and 540 receives a control signal C1 from the controller 4.

The outputs of the AND gates 530 and 540 are added to the coefficient output signals from the coefficient registers 121 and 111 by adders 123 and 113 in the filter 1, respectively. The contents of the registers 121 and 111 are updated by the sums output from the adder 123 and 113, respectively.

The controller 4 receives the sampling clock SCLK, and detects its state. The controller 4 outputs the control signal C2 to the AND gates 213 and 223 of the filter 2, the control signal C5 to the selector 520, and the control signal C1 to the AND gates 530 and 540 in accordance with the detected state of the sampling clock SCLK.

The operation of the overall circuit shown in FIG. 1 will be described below.

Figure 2:
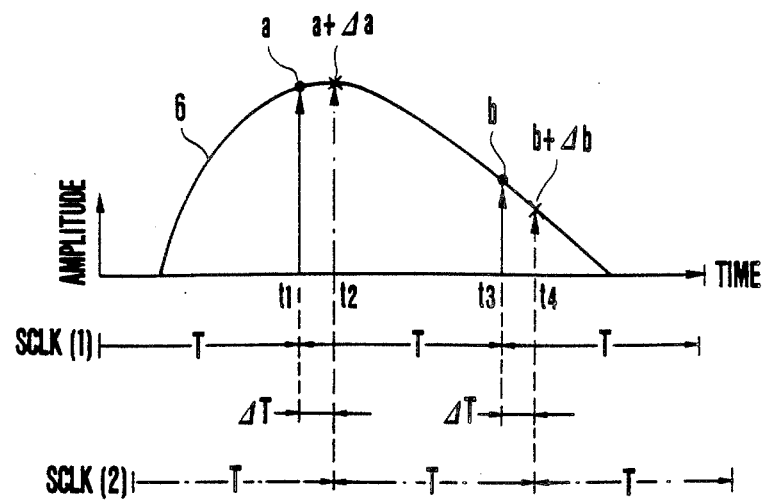
FIG. 2 is a waveform chart for explaining the operation of the circuit shown in FIG. 1.

In FIG. 2, reference numeral 6 denotes a unit pulse response waveform (to be referred to as an echo response hereinafter) of the echo path. A sampling interval of the sampling clocks SCLK is given as T. Reference symbols $t_1$ and $t_3$ denote sampling times of one state SCLK(1) of the sampling clock SCLK; and $t_2$ and $t_4$, sampling times of a state SCLK(2) when the sampling clock SCLK deviates from the state SCLK(1) by $\Delta T$. More specifically, values a and b of the echo response 6 at sampling times $t_1$ and $t_3$ are echo components to be canceled from the output of the sampler 500 when the sampling clock SCLK is in the state SCLK(1). Values $a+\Delta a$ and $b+\Delta b$ of the echo response 6 at sampling times $t_2$ and $t_4$ are echo components to be canceled from the output of the sampler 500 when the sampling clock SCLK is in the state SCLK(2).

The coefficient registers 111 and 112 of the filter 1 hold values obtained by filtering the values a and b through the filter 3. Therefore, the filter 1 can generate the echo canceling signal RS1 corresponding to a value obtained by filtering a sampling value of the echo signal through the filter 3 by a convolution arithmetic operation of the transmission signal and the coefficient registers 111 and 121.

The coefficient registers 211 and 221 of the filter 2 respectively hold differences $\Delta a$ and $\Delta b$ between the sampling values $a+\Delta a$ and $b+\Delta b$ of the echo response in the sampling clock state SCLK(2) and the sampling values a and b in the state SCLK(1).

When the sampling clock SCLK jitters, the controller 4 detects this, and supplies the control signal C2 to the filter 2 to enable the AND gates 213 and 223. As soon as the sampling timing jitter occurs, the convolution arithmetic operation of the transmission signal and the coefficients stored in registers 211 and 221 is performed as in the filter 1, thereby generating an echo canceling signal RS2 for eliminating the influence of the sampling timing jitter. The echo canceling signal RS2 is subtracted from the echo signal at a stage before the filter 3. The values in the coefficient registers 211 and 221 are sequentially input to the filter 510 by the selector 520 in accordance with the control signal C5 from the controller 4, and the output of the filter 510 is sequentially added to the values in the coefficient registers 111 and 121 in the filter 1. Then, the filter 2 is disabled by the control signal C2 from the controller 4.

The possible coefficient transfer and addition method includes a method of transferring and adding all the coefficients within one sampling interval, a method of transferring and adding one coefficient within one sampling interval, and the like.

The filter 3 is a filter for shortening the tail of the echo response and decreasing the number of taps of echo canceling signal generating filters. Echo canceling is normally performed at a stage after the filter 3. However, when the influence of the sampling clock jitter is to be eliminated at a stage after the filter 3, the coefficients of the filters for generating canceling signals cannot be uniquely determined since a transient response of the filter 3 appears for a while as soon as the jitter occurs. For this reason, according to this embodiment, the output signal RS2 from the filter 2 is subtracted from the output signal of the sampler 500 at a stage before the filter 3. Thus, the influence of the sampling clock jitter can be eliminated independently of the filter 3.

As described above, the coefficients of the filter 2 are transferred to the filter 1 to be added to the coefficients of the filter 1, and thereafter, the tap output of the filter 2 is disabled. When the sampling clock jitter occurs again, if the jitter $\Delta T$ of the sampling clock is small, the deviations $\Delta a$ and $\Delta b$ of the sampling values of the echo response can be regarded to be substantially equal to each other. Therefore, the filter 2 can be operated to remove the deviation of the sampling value of the echo signal.

When the coefficients of the filter 2 are adaptively corrected, an echo signal can be canceled regardless of the number of times of sampling clock jitter under the condition that the frequency of occurrence of sampling clock jitter is smaller than the coefficient adaptive correction speed of the filter 2.

In this embodiment, both the filters 1 and 2 comprise 2-tap transversal filters. However, the same effect as in the above embodiment can be obtained in cases other than 2-tap filters. This also applies to cases wherein the filters 1 and 2 have different numbers of taps.

Figure 3:
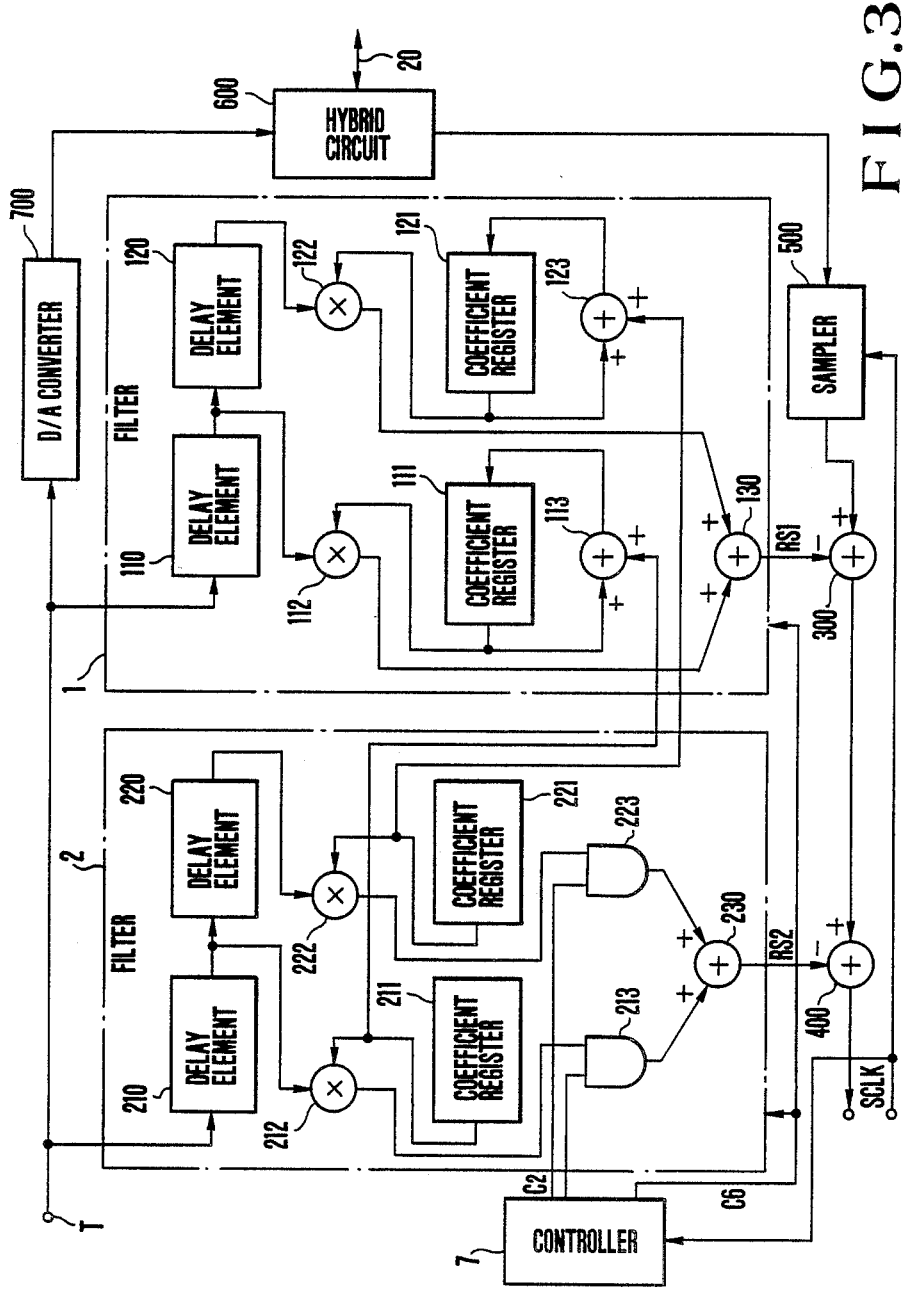
FIG. 3 is a block diagram showing an arrangement of another embodiment of the present invention.

FIG. 3 is a block diagram showing another embodiment of the present invention. The same reference numerals in FIG. 3 denote the same parts as in FIG. 1, and a detailed description thereof will be omitted. The generating operations of the echo canceling signals RS1 and RS2 in the filters 1 and 2 are the same as those in FIG. 1.

In FIG. 3, unlike in FIG. 1, the filter 3 and the coefficient transfer circuit 5 are omitted, and the order of subtracting the echo canceling signals RS1 and RS2 respectively generated by the filters 1 and 2 from the output signal from the sampler 500 is opposite to that in the embodiment of FIG. 1. More specifically, the echo canceling signal RS1 is subtracted from an output signal of the sampler 500 in accordance with the sampling clock SCLK by the adder 300, and thereafter, the echo canceling signal RS2 output from the filter 2 is subtracted from the difference signal output from the adder 300. The signal obtained in this manner is output from the terminal R as the reception signal.

A controller 7 detects a jitter $\Delta T$ of the sampling clock SCLK in the same manner as the controller 3 shown in FIG. 1, and supplies a control signal to the filters 1 and 2 to enable the filter 2. Thus, the filter 2 generates the echo canceling signal RS2, and transfers coefficients stored in the registers 211 and 221 thereof directly to the adders 113 and 123 of the filter 1, thereby updating the contents of the registers 111 and 121.

In this embodiment, since the filters 1 and 2 and the controller 7 are realized by firmware, addition of coefficients is performed at a rate of one coefficient/sampling time so as to avoid concentration of processing procedures at a given sampling time.

Figure 4:
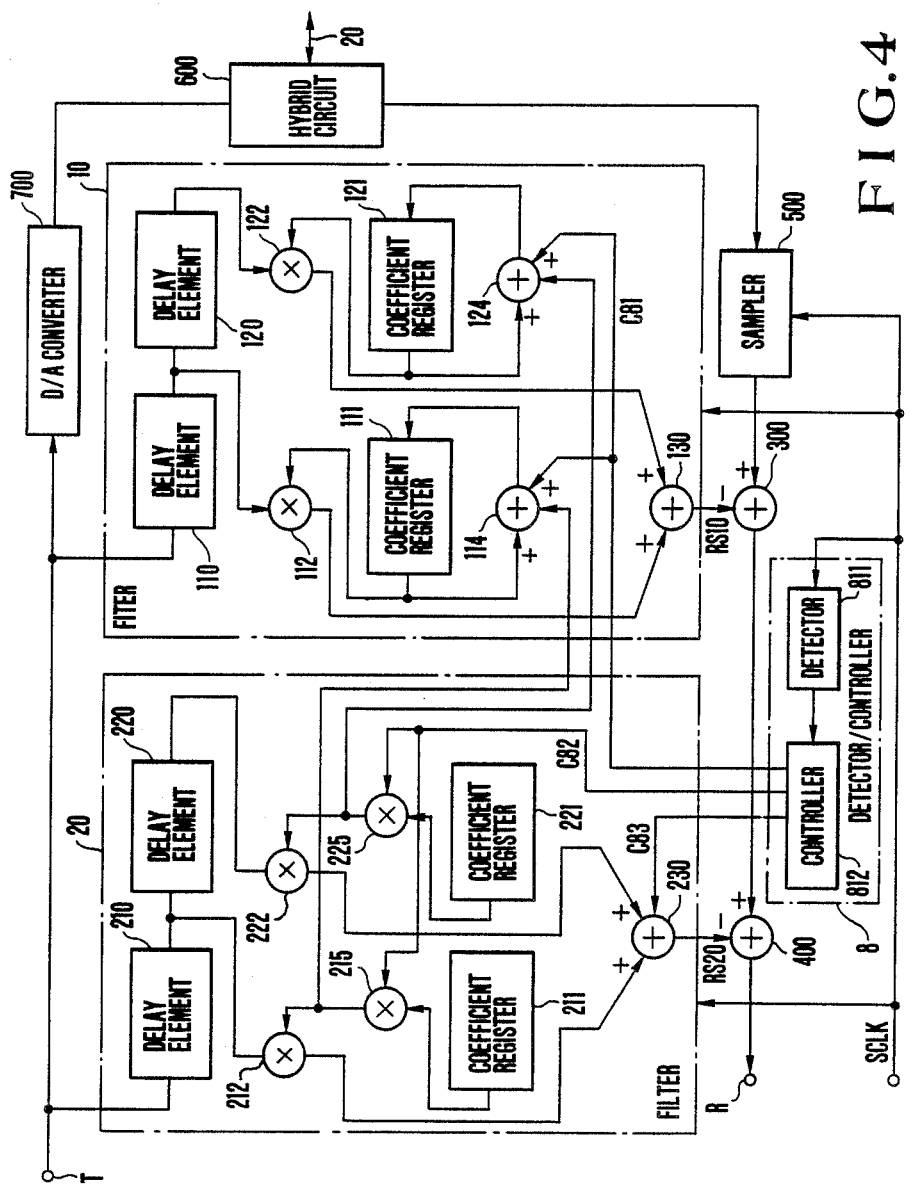
FIG. 4 is a block diagram showing an arrangement of still another embodiment of the present invention.

FIG. 4 shows an arrangement of still another embodiment of the present invention.

In FIG. 4, reference numeral 10 and 20 denote 2-tap transversal filters which respectively generate echo canceling signals RS10 and RS20 to be subtracted from the output from the sampler 500.

Figure 5:
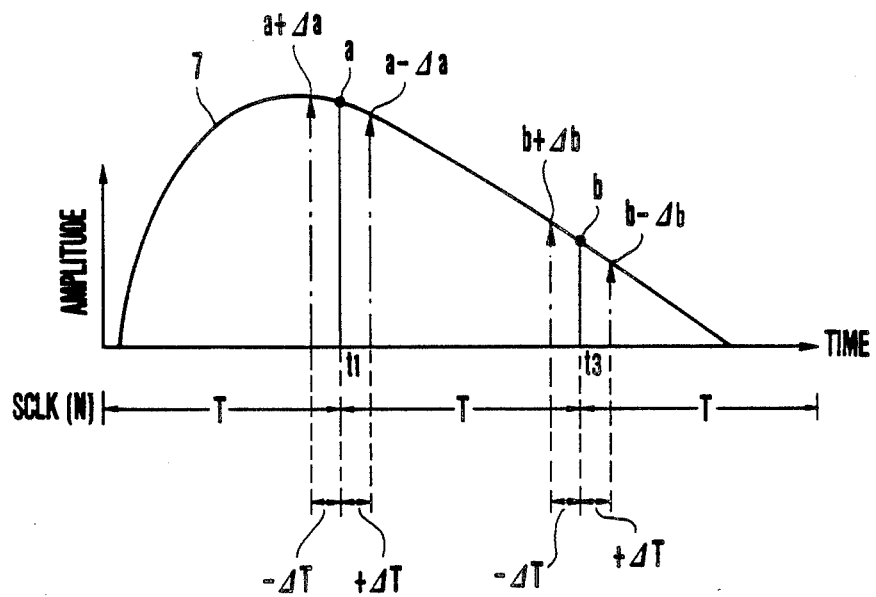
FIG. 5 is a waveform chart for explaining the operation of the circuit shown in FIG. 4.

FIG. 5 shows an echo response of an echo path shown in FIG. 4. Reference symbols $t_1$ and $t_3$ denote sampling times when the sampling clock is in a state SCLK(N). Echo response values at these sampling times are respectively $\underline{a}$ and b. Echo response sampling values at sampling times $t_1 - \Delta T$, $t_1 + \Delta T$, $t_3 - \Delta T$, and $t_3 + \Delta T$ when the sampling clock SCLK deviates from the state SCLK(N) by $\Delta T$ in either direction are respectively $a + \Delta a$, $a - \Delta a$, $b + \Delta b$, and $b - \Delta b$.

In FIG. 4, the filter 10 includes a delay element 110 for delaying an input transmission signal, a coefficient register 111 for holding one sampling value (e.g., $\underline{a}$) of the echo response, a multiplier 112 for multiplying the output of the delay element 110 with the output of the coefficient register 111, a delay element 120 for delaying the output of the delay element 110, a coefficient register 121 for holding the other sampling value (e.g., b) of the echo response, a multiplier 122 for multiplying the output of the delay element 120 with the output of the coefficient register 121, an adder 130 for adding the outputs of the multipliers 112 and 122 and supplying the echo canceling signal RS10 to the adder 300, an adder 114 for adding the output of the coefficient register 111 and the output of a coefficient register 211 of the filter 20 in accordance with a control signal C81 and updating the content of the coefficient register 111 with the sum, and an adder 124 for adding the output of the coefficient register 121 and the output of a coefficient register 221 of the filter 20 in accordance with the control signal C81 and updating the content of the coefficient register 121 with the sum.

The filter 20 includes a delay element 210 for delaying an input transmission signal, the coefficient register 221 for holding a change ($\Delta a$) of one sampling value of the echo response due to the sampling clock jitter, a multiplier 215 for multiplying the output of the coefficient register 211 with a coefficient C82 indicating a direction of the sampling clock deviation (e.g., "−1" in a direction of delaying a sampling clock, and "+1" in a direction of advancing the sampling clock), a multiplier 212 for multiplying the output of the multiplier 215 with the output of the delay element 210, a delay element 220 for delaying the output of the delay element 210, a coefficient register 221 for holding a change ($\Delta b$) of the other sampling value of the echo response, a multiplier 225 for multiplying the output of the coefficient register 221 with the coefficient C82 indicating the direction of the sampling clock deviation, a multiplier 222 for multiplying the output of the multiplier 225 with the output of the delay element 220, and an adder 230 for adding the outputs of the multipliers 222 and 212 and supplying the echo canceling signal RS20 to an adder 400.

A detector/controller 8 includes a detector 811 for receiving the sampling clock SCLK and detecting the sampling clock jitter, and a controller 812 for generating the control signal C81 for causing the adders 114 and 124 of the filter 10 to perform addition, the signal C82 to be supplied to the multipliers 215 and 225 of the filter 20 and indicating the direction of the deviation of the sampling clock, and a control signal C83 for starting the adder 230 of the filter 20 upon detection of the sampling clock jitter, and disabling the adder 230 after the additions of the adders 114 and 124 of the filter 10 are completed.

The operation of the echo canceller shown in FIG. 4 will be described hereinafter.

When the sampling clock SCLK is in the state SCLK(N) in FIG. 5, i.e., at sampling times $t_1$ and $t_3$, the coefficient registers 111 and 121 of the filter 10 respectively hold sampling values a and b of the echo response (curve 7 in FIG. 5). Therefore, a signal corresponding to a sampling value of the echo signal can be generated by a convolution arithmetic operation of the transmission signal and the coefficient registers 111 and 121.

More specifically, the filter 10 receives the transmission signal, and the transmission signal is delayed by the delay elements 110 and 120. The delayed signals from the delay elements 110 and 120 are respectively multiplied with tap coefficient values held in the coefficient registers 111 and 121 by the multipliers 112 and 122. The outputs of the multipliers 112 and 122 are added by the adder 130, thereby generating the echo canceling signal RS10. This operation is always performed in synchronism with the sampling timing of the sampler 500. The contents of coefficient registers 111 and 121 are added to the tap coefficient values held in the coefficient registers 211 and 221 of the filter 20 through the adders 114 and 124 at timings to be described later.

The coefficient registers 211 and 221 of the filter 20 respectively hold deviations $\Delta a$ and $\Delta b$ of the sampling value corresponding to the deviation $\Delta T$ of the sampling clock SCLK(N). Therefore, at an instance when the sampling clock jitter of the sampler 500 occurs, the filter 20 performs a convolution arithmetic operation of the transmission signal and the values obtained by multiplying the coefficient values stored in the coefficient registers 211 and 221 with the coefficient C82 supplied from the controller 812 and indicating the direction of the deviation of the sampling clock SCLK in the same manner as in the filter 10, thereby generating a signal corresponding to the deviations $\Delta a$ and $\Delta b$ of the sampling values due to the deviation $\Delta T$ of the sampling clock SCLK.

When the sampling clock jitter occurs, the detector 811 detects the jitter, and the controller 812 enables the adder 230 based on the detection output from the detector 811. In addition, the controller 812 supplies the coefficient indicating the direction of the deviation of the sampling clock SCLK to the multipliers 215 and 225. In this manner, the filter 20 starts its operation as soon as the sampling clock jitter occurs. Thereafter, the controller 812 outputs the control signal C81 to enable the adders 114 and 124, and adds, to the contents of the coefficient registers 111 and 121, values obtained by multiplying the coefficient values stored in the coefficient registers 211 and 221 with the coefficient indicating the direction of the deviation of the sampling clock SCLK. Thus, the sampling values $a \pm \Delta a$ and $b \pm \Delta b$ shown in FIG. 5 are stored in the coefficient registers 111 and 121 of the filter 10. Since the filter 20 need no longer be operated, the controller 812 disables the adders 230, 114, and 124. That is, the filter 20 stops its operation at an instance when the tap coefficient addition to the filter 10 is performed.

Even when the sampling time jitter occurs again due to the tap coefficient addition and subsequent operation stop of the filter 20, if the sampling time jitter is small, the deviations $\Delta a$ and $\Delta b$ of the sampling value of the echo response can be regarded to be substantially equal to each other. Therefore, the filter 20 can be operated to cancel the sampling value deviations of the echo signal.

The circuit of this embodiment has an arrangement as shown in FIG. 4. In practical applications, respective blocks are not individually arranged but the operations of these blocks are preferably executed by a program of one microprocessor.

In this embodiment, both the filters 10 and 20 comprise 2-tap transversal filters. However, the same effect as in the above embodiment can be obtained in cases other than 2-tap filters. This also applies to cases wherein the filters 10 and 20 have different numbers of taps.

As described above according to the present invention, the sampling value deviations caused by sampling clock jitter can be compensated for. If the sampling clock jitter is relatively small, two or more sampling clock jitters can be compensated for.

What is claimed is:

1. An echo canceller, comprising:

an echo path comprising a D/A converter for converting a digital transmission signal into an analog signal, a hybrid circuit for transmitting the output from said D/A converter onto a transmission path, and receiving and outputting an analog reception signal from said transmission path to a path different from said transmission path, and a sampler for sampling the reception signal and outputting the sampled signal as a digital reception signal;

a first transversal filter which has a first tap coefficient representing an echo path response wave at a fixed sampling time and which generates a first echo canceling signal;

a second transversal filter which has a second tap coefficient representing a deviation of sampled values of said echo path response wave and generates a second echo canceling signal;

subtracting means for subtracting said first and second echo canceling signals from said digital reception signal; and control means for detecting a sampling clock jitter and performing a control operation such that the second echo canceling signal generating operation of said second filter is enabled when said sampling clock jitter occurs, a value of said second tap coefficient is added to a value of said first tap coefficient of to update said value of said first tap coefficient, and thereafter, the second echo canceling signal generating operation of said second filter is disabled.

2. An echo canceller according to claim 1, wherein said subtracting means for subtracting the first and second echo canceling signals from said digital reception signal comprises first subtraction means for subtracting said second echo canceling signal from said digital reception signal, a third filter for filtering the output of said first subtraction means, second subtraction means for subtracting said first echo canceling signal from the output of said third filter, and transferring means for transferring said value of said second tap coefficient to said first filter through a fourth filter having the same transfer function as that of said third filter.

3. An echo canceller according to claim 1, wherein said control means comprises a detector for detecting a direction of a deviation of a sampling clock, and a controller for outputting a signal representing the direction of the deviation, and said second filter comprises multiplying means for multiplying said second tap coefficient with said signal representing the direction of the deviation of the sampling clock.

4. An echo canceller according to claim 2, wherein said control means comprises a detector for detecting a direction of a deviation of a sampling clock, and a controller for outputting a signal representing the direction of the deviation, and said second filter comprises multiplying means for multiplying said second tap coefficient with said signal representing the direction of the deviation of the sampling clock.

* * * * *